US010176319B2

United States Patent
McPherson et al.

(10) Patent No.: US 10,176,319 B2
(45) Date of Patent: Jan. 8, 2019

(54) MAINTAINING SECURE CLUSTERED SOFTWARE WITH A CONTAINER-BASED ARCHITECTURE

(71) Applicant: Red Hat, Inc., Raleigh, NC (US)

(72) Inventors: Daniel McPherson, Raleigh, NC (US); Benjamin Michael Parees, Durham, NC (US); Cesar Augusto Wong, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/951,076

(22) Filed: Nov. 24, 2015

(65) Prior Publication Data

US 2017/0147813 A1    May 25, 2017

(51) Int. Cl.
| G06F 21/00 | (2013.01) |
| G06F 21/55 | (2013.01) |
| G06F 21/56 | (2013.01) |
| G06F 21/50 | (2013.01) |
| G06F 9/455 | (2018.01) |

(52) U.S. Cl.
CPC ........ *G06F 21/554* (2013.01); *G06F 9/45558* (2013.01); *G06F 21/50* (2013.01); *G06F 21/56* (2013.01); *G06F 21/563* (2013.01); *G06F 2009/45562* (2013.01)

(58) Field of Classification Search
CPC ........ G06F 21/50; G06F 21/56; G06F 21/561; G06F 21/562; G06F 21/563; G06F 21/564
See application file for complete search history.

(56) References Cited

U.S. PATENT DOCUMENTS

| 7,000,228 | B2 | 2/2006 | Mortazavi |
| 7,735,097 | B2 | 6/2010 | Kovachka-Dimitrova et al. |
| 8,171,466 | B2 | 5/2012 | Langen et al. |
| 8,589,557 | B1 | 11/2013 | Labat et al. |
| 9,197,663 | B1 * | 11/2015 | Gilbert ................ G06F 3/04817 |
| 2010/0162226 | A1 | 6/2010 | Borissov et al. |
| 2011/0238984 | A1 | 9/2011 | Roush et al. |

(Continued)

OTHER PUBLICATIONS

Sun Microsystems, Inc. "Solaris Containers: Resource Management and Solaris Zones Developer's Guide"; May 2007.

(Continued)

*Primary Examiner* — Edward Zee
(74) *Attorney, Agent, or Firm* — Lowenstein Sandler LLP

(57) ABSTRACT

The subject matter of this specification can be implemented in, among other things, a method that includes receiving, by a processing device in a platform-as-a-service (PaaS) system, package metadata including one or more attributes for each of a plurality of packages. Each of the plurality of packages includes one or more components of one or more applications to execute on the PaaS system. The method further includes receiving threat metadata including one or more attributes for each of a plurality of threats. The method further includes storing the package metadata or the threat metadata in one or more data stores. The method further includes comparing, by the processing device, the attributes of the packages to the attributes of the threats to determine that at least one package among the packages includes at least one threat from the threats.

18 Claims, 4 Drawing Sheets

(56) References Cited

U.S. PATENT DOCUMENTS

2014/0130171 A1* 5/2014 Chiang ............... G06F 21/577
                                                                     726/25

OTHER PUBLICATIONS

Red Hat, Inc. Red Hat Launches Red Hat Enterprise Linux 7 Atomic Host, Advances Linux Containers in the Enterprise; Mar. 5, 2015.
Scott Johnston; "Announcing Docker Machine, Swarm, and Compose for Orchestrating Distributed Apps;" Dec. 4, 2014; Docker Blog.
Jeff Barr; "EC2 Container Service—Latest Features, Customer Successes, and More . . . ;" Jul. 17, 2015; Amazon Web Services.
Twistlock, "Defend your containers," http://web.archive.org/web/20150906094957/https://www.twistlock.com/, 3 pages, retrieved on Apr. 24, 2018.
Twistlock, "Q&A," http://web.archive.org/web/20150915200742/https://www.twistlock.com/qa/, 3 pages, retrieved on Apr. 24, 2018.

* cited by examiner

MAINTAINING SECURE CLUSTERED SOFTWARE WITH A CONTAINER-BASED ARCHITECTURE

TECHNICAL FIELD

This instant specification relates to maintaining secure clustered software with a container-based architecture.

BACKGROUND

A variety of platform-as-a-service (PaaS) system offerings exist that include software and/or hardware facilities for facilitating the execution of web applications in a cloud-computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on its computer hardware available to customers for this purpose.

The cloud provider typically provides an interface that a customer can use to requisition virtual machines and associated resources such as processors, storage, and network services, as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as one or more VMs running on top of a hypervisor in a host server.

DETAILED DESCRIPTION

This document describes systems and techniques for maintaining secure clustered software with a container-based architecture. For example, a platform-as-a-service (PaaS) system may receive package metadata including one or more attributes for each of a plurality of packages. Each of the plurality of packages includes one or more components of one or more applications. Each component may include files and/or data, for example, for a particular functional element of an application. The components may be instantiated with containers. The system also receives threat metadata including one or more attributes for each of a plurality of threats (e.g., viruses, malware, software vulnerabilities, software bugs, other unwanted processes, etc.). The package metadata and/or the threat metadata are stored in one or more data stores. The system compares the attributes of the packages to the attributes of the threats to determine that at least one package among the packages includes at least one threat from the threats.

The systems and techniques described here may provide one or more of the following advantages. First, the system may maintain packages by scanning the package images at build time and without scanning the package images at runtime. Second, the system can maintain packages by automatically identifying attributes of the packages for known package types. Third, the system may maintain packages by automatically identifying attribute values of the packages for attribute types defined for custom package types. Fourth, the system may maintain packages by receiving attributes of packages from a trusted source without scanning the packages from the trusted source for the attributes.

The details of one or more implementations are set forth in the accompanying drawings and the description below. Other features and advantages will be apparent from the description and drawings, and from the claims.

Figure 1:
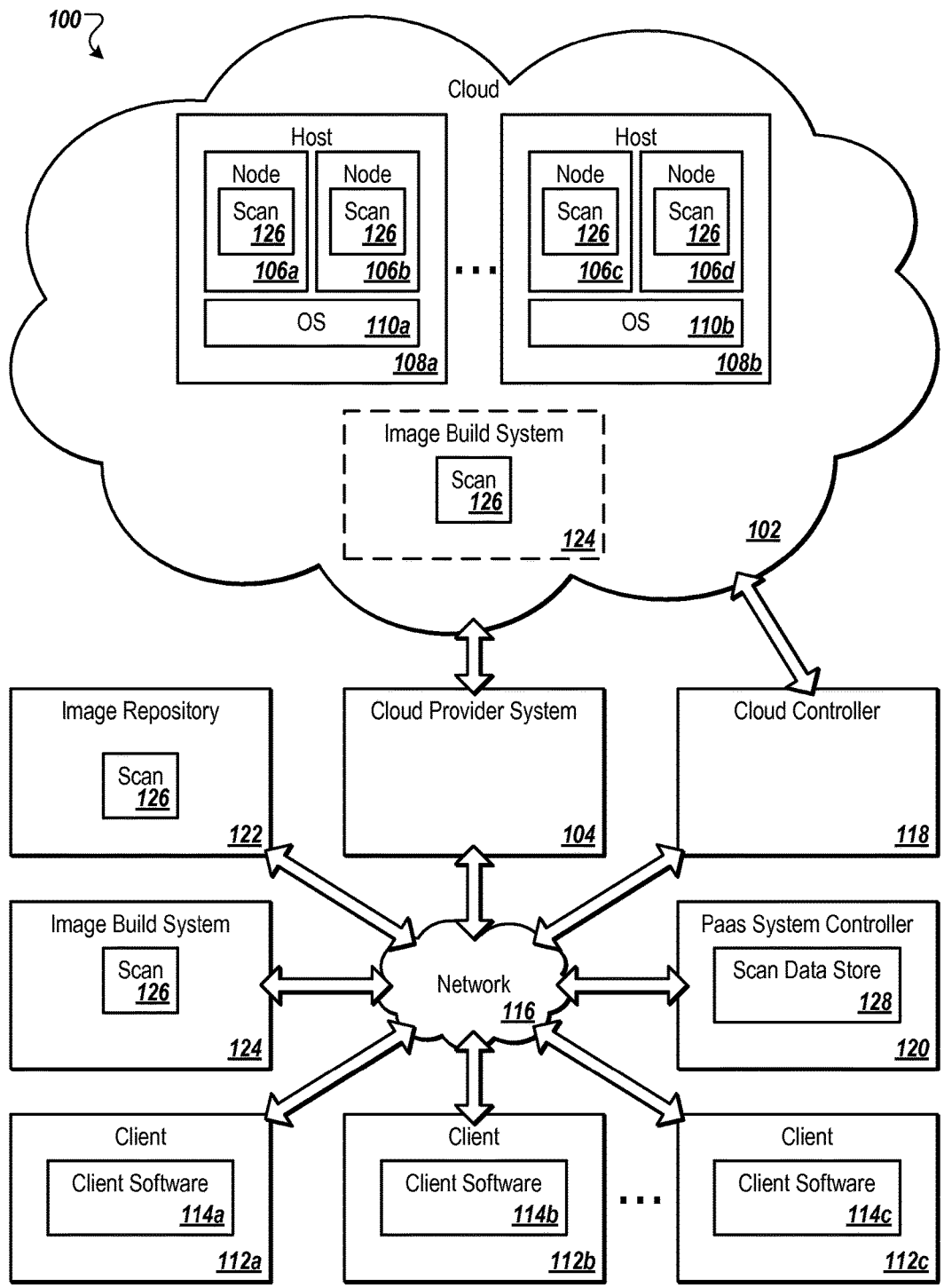
FIG. 1 is a block diagram that shows an example of a network architecture for a platform-as-a-service system.

FIG. 1 is a block diagram that shows an example of a network architecture 100 for a platform-as-a-service system. The network architecture 100 includes a cloud 102 managed by a cloud provider system 104. The cloud provider system 104 provides multiple nodes 106a-d to execute software and/or other processes. In some implementations these nodes are virtual machines (VMs) that are hosted on a physical machine, such as one or more hosts 108a-b, configured as part of the cloud 102. In some implementations, the hosts 108a-b are often located in a data center. For example, the first two of the nodes 106a-b are hosted on the first host 108a and the second two of the nodes 106c-d are hosted on the second host 108b in the cloud 102 provided by the cloud provider system 104. When the nodes 106a-d are implemented as VMs, they may be executed by one or more operating systems (OSs) 110a-b on the hosts 108a-b, respectively.

In some implementations, the hosts 108a-b may be located in a data center. Users can interact with applications executing on the nodes 106a-d in the cloud 102 using client computer systems, such as one or more clients 112a-c, via one or more client applications 114a-c, respectively. The client applications 114a-c may include an application such as a web browser. In other implementations, the applications may be hosted directly on the hosts 108a-b without the use of VMs (e.g., a "bare metal" implementation), and in such an implementation, the hosts themselves are referred to as "nodes."

The clients 112a-c are in communication with the hosts 108a-b in the cloud 102 and the cloud provider system 104 over a network 116, which may be a private network (e.g., a local area network (LAN), a wide area network (WAN), intranet, or other similar private networks) or a public network (e.g., the Internet). Each of the clients 112a-c may be a mobile device, a PDA, a laptop, a desktop computer, a tablet computing device, a server device, or any other computing device. Each of the hosts 108a-b may be a server computer system, a desktop computer or any other computing device. The cloud provider system 104 may include one or more machines such as server computers, desktop computers, etc.

In one implementation, the cloud provider system 104 is in communication with a cloud controller 118 over the network 116. The cloud controller 118 may reside on one or more machines (e.g., server computers, desktop computers, etc.) and may manage the execution of applications in the cloud 102. In some implementations, the cloud controller 118 receives commands from a PaaS system controller 120. Based on these commands, the cloud controller 118 provides data (e.g., such as pre-generated images) associated with different applications to the cloud provider system 104. In some implementations, the data may be provided to the cloud provider system 104 and stored in an image repository 122, in an image repository (not shown) located on each of the hosts 108a-b, or in an image repository (not shown) located on each VM in the nodes 106a-d. This data may be used for the execution of applications for a multi-tenant PaaS system managed by the PaaS system controller 120.

In one implementation, the data used for execution of applications includes application images built from preexisting application components and source code of users managing the application. As discussed above, an image refers to data representing executables and files of the application used to deploy functionality for a runtime instance of the application. An application may include, for example, a web server application or files for an online bulletin board service.

An application image may be built in the PaaS system using an image build system 124 of the PaaS system. In one implementation, the image is built using a Docker™ tool, and is referred to as a Docker image. The image build system 124 may be provided on components hosted by the cloud 102, on a server device external to the cloud 102, or even run on the nodes 106a-d (not shown). The image build system 124 generates an application image for an application by combining a preexisting ready-to-run application image corresponding to core functional components of the application (e.g., a web framework, database, etc.) with source code specific to the application provided by the user. The resulting application image may be pushed to the image repository 122 for subsequent use in launching instances of the application images for execution in the PaaS system.

Upon receiving a command identifying specific data (e.g., application data and files, such as application images, used to initialize an application on the cloud) from the PaaS system controller 120, the cloud provider system 104 retrieves the corresponding data from the image repository 122, creates an instance of the application, and loads the instance to the hosts 108a-b to run on the nodes 106a-d. In addition, a command may identify specific data to be executed on one or more of the nodes 106a-d. The command may be received from the cloud controller 118, from the PaaS system controller 120, or a user (e.g., a system administrator) via a console computer or a client machine. The image repository 122 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, one or more scan components 126 are located at the nodes 106a-d, the image repository 122, and/or the image build system 124. The scan components 126 may include one or more pluggable scanning processes installed to provide pattern detection in order to identify threats (e.g., viruses, malware, software vulnerabilities, software bugs, other unwanted processes, etc.) existing in the PaaS system. For example, the scan components 126 may compare attributes of the application images to attributes of threats. The attributes may include, but are not limited to, for example, file names, file sizes, a hash value of the application image, or other metadata, such as an application version, name, or another application identifier. The scan components 126 may identify a threat when one or more of the attributes of an application image match or are similar to one or more corresponding attributes of a threat.

The scan components 126 may be distributed throughout the PaaS system to provide for separate build-time, runtime, and/or image repository scans. Some implementations optimize scanning performed by the scan components 126 of images and runtime environments of applications of the PaaS. For example, the scan components 126 may be optimized to take advantage of the image-based model for application deployment utilized by the PaaS. Full application image scans may be performed by one of the scan components 126 residing at the image build system 124. Each time an application image is built, one of the scan components 126 at the image build system 124 analyzes the output of the build to determine whether the application image is clean or if attributes of the application image match a threat. A result of the built application image scan process is stored in a scan data store 128 maintained by the PaaS system controller 120.

In some implementations, the scan data store 128 may store the attributes of the application images that were identified by the scan components 126. The scan data store 128, or another data store, may also store the attributes of the threats. When new scan definitions or threats are released, one of the scan components 126 residing in the image repository 122 may scan the existing application images and update the scan data store 128 with the results. The PaaS system controller 120 may then compare the attributes of the new threats to the newly scanned attributes of the images to determine whether any of the images contain the new threat. Alternatively, the PaaS system controller 120 may compare the new scan definitions for the threats to the previously stored attributes of the application images already in the scan data store 128. When a new application image is built by the image build system 124 or added to the image repository 122, the scan component may scan the new application image to identify the attributes of the image. The PaaS system controller 120 may then compare the attributes of the new application image to the attributes of the threat definitions previously stored in the scan data store 128 to determine whether the new application image contains one of the threats. In this way, the scan components 126 and the PaaS system controller 120 may determine that a threat exists in an image when a new threat definition is received without rescanning the previously scanned images and when a new image is built or deployed without reprocessing the previously received threat definitions that have already been stored in the scan data store 128.

The scan components 126 at each of the nodes 106a-d may also be configured to scan the running (e.g., top-most) layer of each application image instance on respective ones of the nodes 106a-d, while ignoring all other layers of the application image. Each application image includes multiple layers of files and once instantiated within the nodes 106a-d, a top-most layer may be added that may be configurable, while the remaining lower layers are immutable or unchangeable. As a result of running a scan of the built application image at build-time, the lower layers of an application image instance running on a node are assumed to be clean in terms of scanning. Consequently, the scan components 126 at the nodes 106a-d scan just the top-most configurable layer of running application components on each of the nodes 106a-d, thus saving resources in the PaaS system that were previously consumed in running full image scans at the nodes 106a-d. Further details of the scan components 126 and their related workflows are described below.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 122 may run directly on one of the hosts 108a-b instead of being instantiated on the nodes 106a-d. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
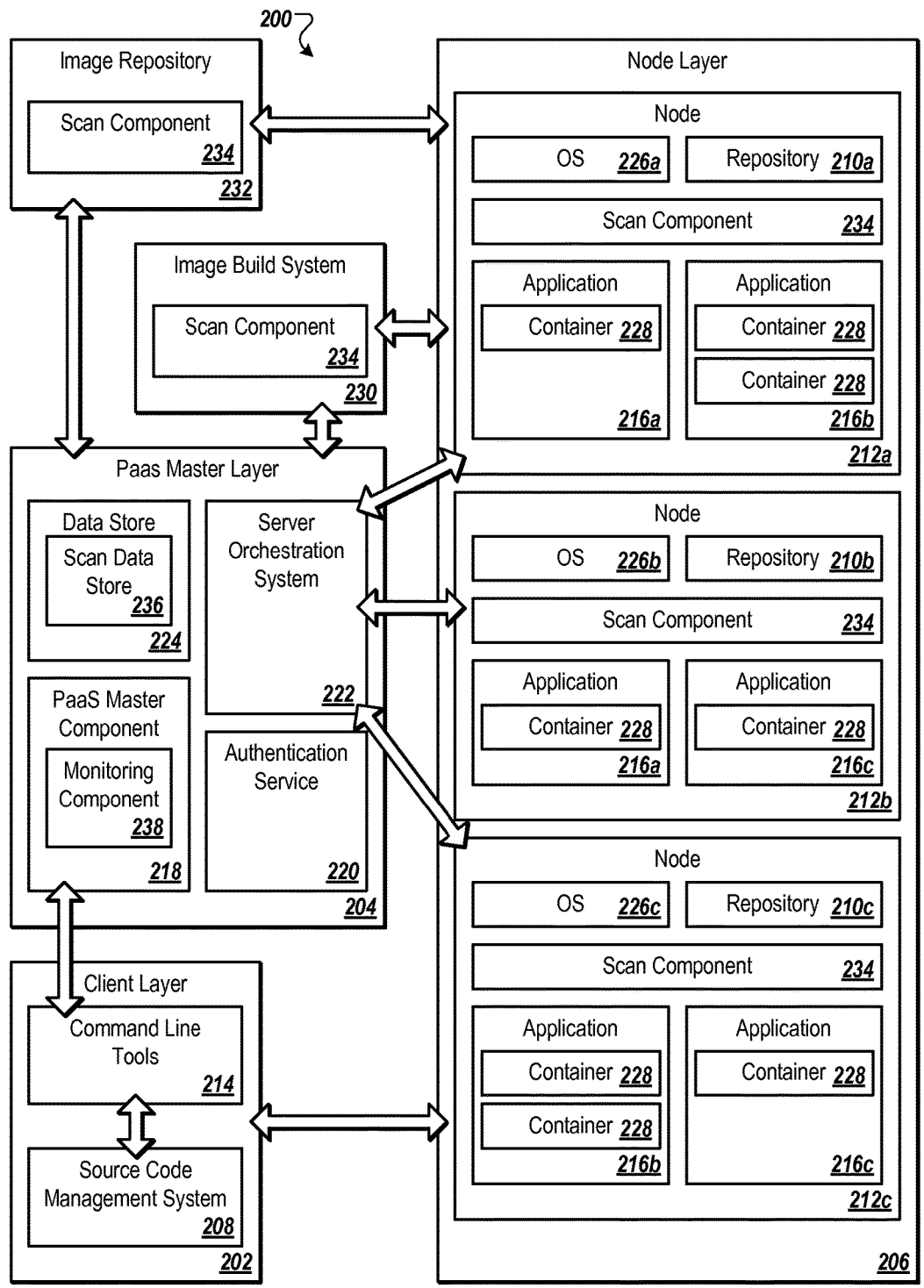
FIG. 2 is a block diagram that shows an example of a platform-as-a-service system architecture.

FIG. 2 is a block diagram that shows an example of a PaaS system architecture 200. The PaaS system architecture 200 allows users to launch software applications in a cloud computing environment, such as the cloud computing environment provided in the network architecture 100 described with respect to FIG. 1. The PaaS system architecture 200, in one implementation, includes a client layer 202, a PaaS master layer 204, and a node layer 206.

In one implementation, the components of the PaaS system architecture are in communication with each other via a network (not shown). The network may include, for example, the Internet. In other implementations, other networks, wired and wireless, such as an intranet, local area network (LAN), wide area network (WAN), or broadcast network may be used.

In one implementation, the client layer 202 resides on a client machine, such as a workstation of a software developer, and provides an interface to a user of the client machine to the PaaS master layer 204 of the PaaS system architecture 200. In one implementation, the client machine can be one of the clients 112a-c described with respect to FIG. 1. The PaaS master layer 204 may facilitate the creation and deployment on the cloud 102 (via the node layer 206) of software applications being developed by an end user at the client layer 202.

In one implementation, the client layer 202 includes a source code management system 208, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system architecture 200. The packaged software application can then be "pushed" from the local SCM repository to a remote SCM repository, such as one or more repositories 210a-c at one or more nodes 212a-c, respectively, that run the associated application. From the repositories 210a-c, the code may be edited by others with access, or the application may be executed by a machine. Other SCM systems work in a similar manner.

The client layer 202, in one implementation, also includes a set of one or more command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 204 and perform other applications management tasks in an automated fashion using other interfaces, as will be described in more detail further below in accordance with some implementations.

In one implementation, the PaaS master layer 204 acts as middleware between the client layer 202 and the node layer 206. The node layer 206 includes the nodes 212a-c on which one or more applications 216a-c are provisioned and executed. In one implementation, each of the nodes 212a-c is a VM. In some implementations, the VMs are provisioned by an Infrastructure as a Service (IaaS) provider. In other implementations, the nodes 212a-c may be physical machines or VMs residing on a single physical machine. In one implementation, the PaaS master layer 204 is implemented on one or more machines, such as server computers, desktop computers, etc. In some implementations, the PaaS master layer 204 may be implemented on one or more machines separate from machines implementing each of the client layer 202 and the node layer 206, or may be implemented together with the client layer 202 and/or the node layer 206 on one or more machines, or some combination of the above.

In one implementation, the PaaS master layer 204 includes a PaaS master component 218 that coordinates requests from the client layer 202 with actions to be performed at the node layer 206. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at the client layer 202, can request the creation of a new one of the applications 216a-c, deployment of source code of one of the applications 216a-c, or the designation of a system that hosts a remote SCM repository, etc. In response to receiving such a request, the PaaS master component 218 may first authenticate the user using an authentication service 220. In one implementation, the authentication service 220 may comprise custom authentication methods, or standard protocols such as SAML, Oauth, etc. Once the user has been authenticated and allowed access to the system by the authentication service 220, the PaaS master component 218 uses a server orchestration system 222 to collect information and configuration information about the nodes 212a-c.

In one implementation, the PaaS master component 218 uses the ETCD™ service available from CoreOS™ as the server orchestration system 222, but other server orchestration systems may also be used. The server orchestration system 222, in one implementation, functions to coordinate server-client interaction between multiple (sometimes a large number of) servers. In one implementation, the servers being orchestrated are the nodes 212a-c, which are acting as application servers and web servers.

In one implementation, the PaaS master component 218 manages the business logic and model representing the nodes 212a-c and the applications 216a-c residing on the nodes 212a-c, and acts as a controller that generates the actions requested by users via an API of the command line tools 214. The server orchestration system 222 then takes the actions generated by the PaaS master component 218 and orchestrates execution of the actions on the nodes 212a-c managed by the system.

In one implementation, the information collected about the nodes 212a-c can be stored in a data store 224. In one implementation, the data store 224 can be a locally-hosted database or file store, or it can be a cloud-based storage service provided by a Software-as-a-Service (SaaS) provider. The PaaS master component 218 uses the information about the nodes 212a-c and the ones of the applications 216a-c at each of the nodes 212a-c to model the application hosting service and to maintain records about the nodes 212a-c. In one implementation, data of one or more of the nodes 212a-c is stored in the form of a JavaScript™ Object Notation (JSON) blob or string that maintains key-value pairs to associate a unique identifier, a hostname, a list of applications, and other such attributes with each of the nodes 212a-c.

In some implementations, the PaaS system architecture 200 of FIG. 2 is a multi-tenant PaaS environment. In a multi-tenant PaaS environment, each of the nodes 212a-c may run multiple ones of the applications 216a-c that may be owned or managed by different users and/or organizations. As such, a first customer's deployed ones of the applications 216a-c may co-exist with any other customer's deployed applications on the same node that is hosting the first customer's deployed ones of the applications 216a-c. In some implementations, portions of an application execute on multiple different ones of the nodes 212a-c. For example, as shown in FIG. 2, components of the first application 216a run on both the first node 212a and the second node 212b. Similarly, components of the second application 216b run in the first node 212a and the third node 212c, while components of the third application 216c run in the second node 212b and the third node 212c.

In one implementation, each of the nodes 212a-c is implemented as a VM and has one of multiple operating systems 226a-c that can execute the applications 216a-c using the repositories 210a-c that are resident on the nodes 212a-c. Each of the nodes 212a-c also includes a server orchestration system agent (not shown) configured to track and collect information about the nodes 212a-c and to perform management actions on the nodes 212a-c. The server orchestration system agent may operate in tandem with the server orchestration system 222 to send requests, queries, and commands between the nodes 212a-c and the PaaS master layer 204.

As discussed above, each of the nodes 212a-c runs one or more of the applications 216a-c. Each of the nodes 212a-c runs an application by launching an instance of an application image as one or more containers 228 for respective ones of the applications 216a-c on the nodes 212a-c. An application image includes the underlying support software that implements the functionality of one of the applications 216a-c. An application image for an application may be built by an image build system 230, which may be separate from or part of the node layer 206. The image build system 230 may be the same as the image build system 124 described with respect to FIG. 1.

As discussed above, the image build system 230 may generate an application image from a combination of preexisting ready-to-run application images related to core functionality of the application and source code provided by a user of the application. For example, the preexisting ready-to-run application images may include support software providing functionality (e.g., configuration templates, scripts, dependencies, etc.) used to run the applications 216a-c and/or add a feature to the applications 216a-c. For example, the images may support languages such as, but not limited to, Java™, PHP, Ruby, Python, Perl, and so on. In addition, application images may be generated that support databases, such as MySQL™ PostgreSQL™, Mongo™, and others. Preexisting ready-to-run application images may also include those that support the build and continuous integration environments, such as a Jenkins-based image. Lastly, preexisting ready-to-run application images may be used to support management capabilities and/or tools, such as PHPmyadmin, RockMongo™, 10gen-mms-agent, HAProxy, Maven, and Gradle, for example.

Each application image built by the image build system 230 may map to a functional component of one of the applications 216a-c. As such, an application may have more than one application image associated with the application. Built application images may be pushed to an image repository 232 for storage and accessibility for subsequent use in launching instances of the application images at the containers 228 in the nodes 212a-c. The image repository 232 may be the same the image repository 122 described with respect to FIG. 1.

Each of the containers 228 is a resource-constrained process space on each of the nodes 212a-c to execute functionality of one or more of the applications 216a-c. In some implementations, each of the containers 228 is established by the nodes 212a-c with resource boundaries, including a limit and/or designation of the amount of memory, amount of storage, and security types and/or labels to be applied to any functions executed by a respective one of the containers 228. In one implementation, the containers 228 may be established using Linux Containers (LXC) or Docker containers. In further implementations, the containers 228 may also be established using more primitive features, such as cgroups, SELinux™, and kernel namespaces, to name a few examples.

Application image instances for each of the applications 216a-c may be launched in the containers 228 dispersed over more than one of the nodes 212a-c. In other implementations, application image instances for each of the applications 216a-c may run in one or more of the containers 228 on one of the nodes 212a-c. Furthermore, each of the applications 216a-c may use more than one application image as part of providing functionality for the applications 216a-c. One example of this is a JavaEE™ application that uses a JBoss™ application server-based application image with a supporting MySQL™ database provided by a MySQL™-based application image.

In one implementation, one or more scan components 234 are located at the nodes 212a-c, the image build system 230, and/or the image repository 232. The scan components 234 may be the same as the scan components 126 described with respect to FIG. 1. Each of the scan components 234 may include one or more pluggable scanning processes (e.g., clamav, rkhunter, malware finder, etc.) installed to provide pattern detection in order to identify threats (e.g., viruses, malware, other unwanted processes, etc.) existing in the PaaS system architecture 200. Some implementations optimize scanning by the scan components 234 of images and runtime environments of applications of the PaaS system architecture 200.

The scan components 234 are distributed throughout the PaaS system to provide for separate build-time, runtime and image repository scans. The scan components 234 are optimized to take advantage of the image-based model for application deployment utilized by the PaaS. Full application image scans may be performed by one of the scan components 234 residing at the image build system 230. Each time an application image is built by the image build system 230, the scan component at the image build system 230 analyzes the output of the build to determine whether the application image is clean. For example, one of the scan components 234 may run pattern detection according to a definition file configured at the scan component on each layer of the built application image.

A result of the built application image scan process is stored in a scan data store 236 maintained by the PaaS master layer 204, for example in the data store 224. The scan data store 236 may be the same as the scan data store 128 described with respect to FIG. 1. In one implementation, the information maintained in the scan data store 236 includes, but is not limited to, a unique identifier of the layer of the image being scanned (e.g., a checksum of the layer), the scan process (e.g., clamav, rkhunter, etc.), a definition version of the scan process run against the image layer, and a result of the scan (e.g., clean, failed, etc.).

In some implementations, one of the scan components 234 at the image build system 230 may utilize previous scan results to streamline the scan process of a built application image by skipping a scan of the layers of the built application image that have already been scanned in previous scans (as documented in the scan data store 236). For example, previous scans of the application image layers corresponding to the previously-existing ready-to-run application images used to build the new application image may be used to skip the scan process for those layers in the newly built image. In this way the scan components 234 may scan the built application images once at the time they are built without scanning them again at the time they running within the nodes 112a-c. In one implementation, a "diff" process may be utilized between the previously-existing ready-to-run image and the newly-built image in order to identify the differences that should be scanned by the scan component at the image build system 230.

In one implementation, if an application image layer fails the scan process (e.g., a defined pattern is detected by one of the scan components 234), then the scan component alerts a monitoring component 238 of the PaaS master component 218. The monitoring component 238 may begin a takedown process to remove the application image from the PaaS system. The monitoring component 238 may also instruct the image build system 230 to build the application image again. In some implementations, the monitoring component 238 may specify a version of the application to be used for the image, for example, where the scan definition of a threat in the scan data store 236 specifies a version of an application in which a threat is corrected. In response to the new application image being created by the image build system 230, the monitoring component 238 may further instruct the image repository 232 to deploy the new application image to one or more of the containers 228 at one or more of the nodes 212a-c.

When new scan definitions are released, one of the scan components 234 residing in the image repository 232 scans all existing application images and updates the scan data store 236 with the scan results. If a pattern is detected in any of the application images maintained at the image repository 232, then the scan component provides a list of images affected by the failed scan to the monitoring component 238. The monitoring component 238 may then determine which of the containers 228 that are running include any of the images in the list, and initiate a takedown process for those ones of the containers 228 as well as the affected images in the image repository 232. The monitoring component 238 may also initiate build processes and/or a redeploy processes for the containers 228 on the list and/or the affected images the image repository 232.

The scan components 234 at each of the nodes 212a-c are configured to scan the running (e.g., top-most) layer of each application image instance on the containers 228 of the nodes 212a-c, while ignoring all other layers of the application image. Each application image includes multiple layers of files and once instantiated within one of the containers 228, the container adds a top-most layer that may be configurable, while the remaining lower layers are immutable or unchangeable. As a result of running a scan of the built application image at build-time as described above, the lower layer of an application image instance running on each of the nodes 212a-c is assumed to be clean in terms of scanning. Consequently, the scan components 234 at the nodes 212a-c scan just the top-most configurable layer of running application components on the nodes 212a-c, thus saving resources in the PaaS system that were previously consumed in running full image scans at the nodes 212a-c. The scan components 234 at each node may be configured to run on an iterative time period (e.g., once a day, etc.) to examine all of the containers 228 running on the node.

In some implementations, combining or integrating one or more of the scan components 234, the image repository 232, the image build system 230, or the monitoring component 238 allows the PaaS system architecture 200 to detect threats, rebuild affected images, redeploy the affected images, and/or revalidate the redeployed images to verify that the applications in the redeployed images are functioning. The monitoring component 238 may be configured to automatically rebuild and/or redeploy the affected images upon receiving a notification from the scan components 234 that the threats were detected in the images. Alternatively, the monitoring component 238 may be configured to automatically take down one or more of the applications in images identified as being affected by the threats. In yet another implementation, the monitoring component 238 may be configured to notify a system administrator about the threats and wait for user input that directs the monitoring component 238 to takedown, rebuild, and/or redeploy the affected images.

Figure 3:
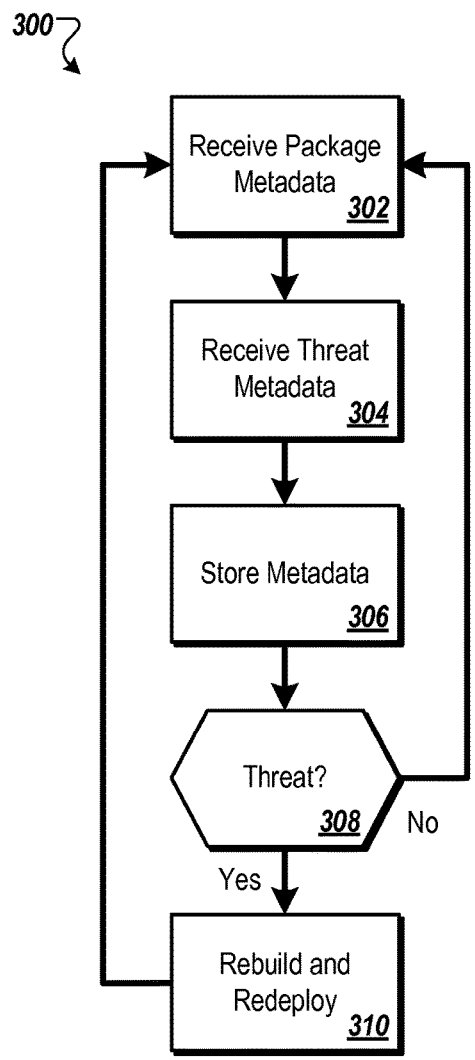
FIG. 3 is flow chart that shows an example of a process for maintaining secure clustered software with a container-based architecture.

FIG. 3 is a flow chart that shows an example of a process 300 for maintaining secure clustered software with a container-based architecture, in accordance with some aspects of the disclosure. The process 300 may be performed, for example, by a system such as the network architecture 100 or the PaaS system architecture 200. For clarity of presentation, the description that follows uses the network architecture 100 or the PaaS system architecture 200 as examples for describing the process 300. However, another system, or combination of systems, may be used to perform the process 300.

The process 300 begins, at block 302, with receiving, by a processing device in a platform-as-a-service system, package metadata. The package metadata includes one or more attributes for each of a plurality of packages. The attributes may include, but are not limited to, for example, file names, file sizes, a hash value of the application image, or other metadata, such as an application version, name, or another application identifier. The plurality of packages includes one or more components of one or more applications. Each component may include files and/or data, for example, for a particular functional element of an application, such as files for a web server application, files for configuration of the web server application, files for a database application, or data to be populated in the database application. For example, the scan component 126 in the image repository 122 of FIG. 1 or the scan component 234 in the image repository 232 of FIG. 2 may scan the application images in the repository to identify metadata that includes attributes of the applications in the images. Alternatively, the scan component 126 in the image build system 124 of FIG. 1 or the scan component 234 in the image build system 230 of FIG. 2 may scan the application images in the repository to identify metadata that includes attributes of the applications in the images. The PaaS system controller 120 or the PaaS master layer 204 may then receive the metadata and store the metadata in the scan data store 128 of FIG. 1 or the scan data store 236 of FIG. 2, respectively.

In some implementations, receiving the package metadata includes receiving the attributes of one or more of the packages from a trusted source that provides one or more of the packages and without a scan of the contents of the provided packages. For example, the image build system 124, the image repository 122, or another provider of application images (not shown) may be a trusted source to the PaaS system controller 120, or the image build system 230, the image repository 232, or another provider of application images (not shown) may be a trusted source to the PaaS master layer 204. The trusted source may be trusted based on authenticating itself with the PaaS system controller 120 or the PaaS master layer 204, such as with the authentication service 220.

In some implementations, receiving the package metadata includes creating hashes of one or more of the packages that are provided by an untrusted source. For example, the PaaS system controller 120 or the PaaS master layer 204 may create a hash of the contents of each application image. The hash may uniquely identify the application image.

At block 304, the process 300 includes receiving threat metadata. The threat metadata includes one or more attributes for each of a plurality of threats. The attributes may include, but are not limited to, for example, file names, file sizes, a hash value of an application image, or other metadata, such as an application version, name, or another application identifier. The attributes of the threats correspond to the attributes of the packages. For example, the PaaS system controller 120 or the PaaS master layer 204 may receive the threat metadata from a provider of the applications or a third party, such as a company specializing in software security.

At block 306, the process 300 includes storing the package metadata and the threat metadata in one or more data stores. For example, the PaaS system controller 120 or the PaaS master layer 204 may store the package metadata and the threat metadata in the scan data store 128 of FIG. 1 or the scan data store 236 of FIG. 2, respectively.

At block 308, the process 300 includes comparing the attributes of the packages to the attributes of the threats to determine whether any of the packages include any of the threats. For example, one of the scan components 126 in the image repository 122 or the image build system 124 of FIG. 1, one of the scan components 234 of the image repository 232 or the image build system 230 of FIG. 2, the PaaS system controller 120, or the monitoring component 238 may compare the attributes of the packages in the package metadata to the attributes of the threats in the threat metadata to identify threats in the packages.

In some implementations, determining that a package includes a threat includes determining that a package indirectly includes a threat. For example, the package metadata in the scan data store 236 may indicate that a child package has a dependency on a parent package. As a result of the dependency, the monitoring component 238 may determine that the child package has an indirect threat due to one of the scan components 236 determining that the parent package includes a direct threat.

In some implementations, the comparison of the attributes of the packages to the attributes of the threats occurs without a comparison of the attributes of the packages to the attributes of the threats at runtime of the packages. For example, the ones of the scan components 126 of FIG. 1 at the image repository 122 and/or the image build system 124 and the scan components of FIG. 2 at the image repository 232 and/or the image build system 230 may scan the application images as they are built. The ones of the scan components 126 of FIG. 1 in the nodes 106a-d and the scan components of FIG. 2 in the nodes 212a-c may perform scans of the application images while the application images are running, but only the layers of the application images that were not scanned at build time or that contain data that may be modified at runtime are scanned.

In some implementations, one or more of the packages have a known package type and types of the attributes of the one or more of the packages are predefined for the known package type. A known package type may be a particular format of packages provided by a particular package management application or system. For example, the scan components 234 may determine that the package has a known package type from a particular package management application, such as RPM Package Manager (RPM), RubyGems, or Maven. Each known package type may be associated with a particular set of attribute types. The scan components 234 may access a corresponding portion of each application image based on the known package type to identify each of the attribute values for the attribute types that are associated with the package type.

In some implementations, one or more of the packages have a custom package type and types of the attributes of the one or more of the packages are defined in a configuration setting for the custom package type. For example, the provider of a package with a custom package type may provide a configuration file, or other form of data, that defines the types of attributes that the custom package type may have. For example, the configuration setting may specify an identifier of an attribute type, which may be found in the package and used to locate an attribute value for the attribute type, and/or the configuration setting may specify a location within the package where an attribute value for an attribute may be found. The PaaS system controller 120 may store the types of attributes for the custom package type in the scan data store 128 or another data store, or the PaaS master layer 204 may store the types of attributes for the custom package type in the scan data store 236 or another data store. When the scan components 126 of FIG. 1 or the scan components 234 of FIG. 2 identify a package as having the custom package type, they use the attribute types defined for the custom package type to identify attribute values for the attribute types within the package.

At block 310, the process 300 includes rebuilding and redeploying the packages that were determined to include threats. For example, where a flaw in an application image has occurred after the application image was built, the PaaS master layer 204 may instruct the image build system 230 to rebuild the same application image and the rebuilt application image may be redeployed from the image repository 232 to one or more of the nodes 212a-c. In another example, where the PaaS master layer 204 determines that a new version of the application corrects an identified threat in an application image, then the PaaS master layer 204 may instruct the image build system 230 to build the new version of the application image and the rebuilt new version of the application image may be redeployed from the image repository 232 to one or more of the nodes 212a-c.

If there are no threats in the packages or once any packages with threats are handled, the process 300 may return to block 302. For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
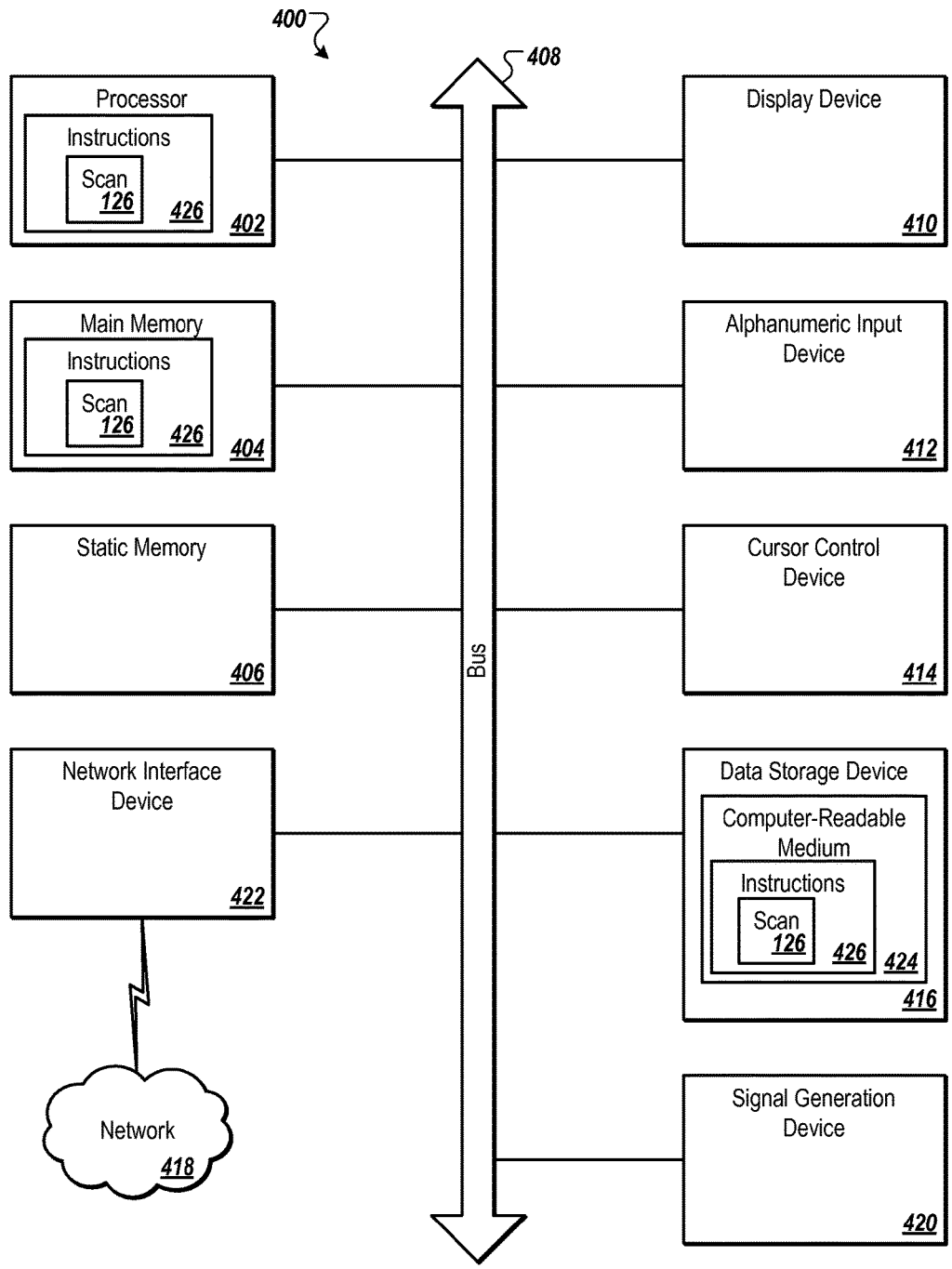
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of items in the network architecture 100 and the PaaS system architecture 200 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 for the items in the network architecture 100 and the PaaS system architecture 200, such as the scan components 126, the scan components 234, the client software 114a-c, the client layer 202, the command line tools 214, the source code management system 208, the image build system 124, the image build system 230, the image repository 122, the image repository 232, the cloud provider system 104, the PaaS master layer 204, the PaaS master component 218, the monitoring component 238, the server orchestration system 222, the authentication service 220, the data store 224, the scan data store 128, the scan data store 236, the cloud 102, the hosts 108a-b, the node layer 206, the nodes 106a-d, the nodes 212a-c, the operating systems 110a-b, the operating systems 226a-c, the repositories 210a-c, the applications 216a-c, and the containers 228 embodying any one or more of the methodologies or functions described herein. The sets of instructions 426 of the items in the network architecture 100 and the PaaS system architecture 200 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device in a platform-as-a-service (PaaS) system, package metadata comprising one or more attribute values for each of a plurality of packages, wherein each of the packages comprises one or more components of one or more applications to execute on the PaaS system, and wherein receiving the package metadata comprises receiving the attribute values of one or more trusted packages among the packages from a trusted source that provides the trusted packages and without scanning, by the PaaS system, contents of the trusted packages for the attribute values of the trusted packages;
   receiving threat metadata comprising one or more attribute values for each of a plurality of threats;
   storing the package metadata or the threat metadata in one or more data stores; and
   comparing, by the processing device, the attribute values of the packages to corresponding ones of the attribute values of the threats to determine that at least one package among the packages comprises at least one threat from the threats.

2. The method of claim 1, further comprising rebuilding and redeploying the package in response to the determination that the package comprises the threat.

3. The method of claim 2, wherein the comparison of the attribute values of the packages to the corresponding ones of the attribute values of the threats occurs without a comparison of the attribute values of the packages to the corresponding ones of the attribute values of the threats at runtime of the applications in the packages.

4. The method of claim 3, wherein receiving the package metadata comprises creating hashes of one or more untrusted packages among the packages that are provided by an untrusted source.

5. The method of claim 4, wherein one or more known packages among the packages have a known package type, wherein known attribute types of the attribute values of the known packages are predefined for the known package type, and wherein receiving the package metadata comprises accessing a portion of the known packages based on the known package type to identify the attribute values for the known attribute types of the known packages.

6. The method of claim 5, wherein one or more custom packages among the packages have a custom package type, wherein custom attribute types of the attribute values of the custom packages are defined in a configuration setting for the custom package type, wherein the configuration setting specifies identifiers or locations of the custom attribute types in the custom packages that are used to locate the attribute values for the custom attribute types within the custom packages, and wherein receiving the package metadata comprises identifying the custom packages as having the custom package type and using the identifiers or the locations of the custom attribute types for the custom package type to identify the attribute values for the custom attribute types within the custom packages.

7. A non-transitory computer-readable medium having instructions stored therein that, when executed by a processing device, cause the processing device to:
   receive, by the processing device in a platform-as-a-service (PaaS) system, package metadata comprising one or more attribute values for each of a plurality of packages, wherein each of the packages comprises one or more components of one or more applications to execute on the PaaS system, and wherein, to receive the package metadata, the instructions are further to cause the processing device to receive the attribute values of one or more trusted packages among the packages from a trusted source that provides the trusted packages and without a scan, by the PaaS system, of contents of the trusted packages for the attribute values of the trusted packages;

receive threat metadata comprising one or more attribute values for each of a plurality of threats;

store the package metadata or the threat metadata in one or more data stores; and compare, by the processing device, the attribute values of the packages to corresponding ones of the attribute values of the threats to determine that at least one package among the packages comprises at least one threat from the threats.

8. The computer-readable medium of claim 7, wherein the instructions are further to cause the processing device to rebuild and redeploy the package in response to the determination that the package comprises the threat.

9. The computer-readable medium of claim 8, wherein the comparison of the attribute values of the packages to the corresponding ones of the attribute values of the threats occurs without a comparison of the attribute values of the packages to the corresponding ones of the attribute values of the threats at runtime of the applications in the packages.

10. The computer-readable medium of claim 9, wherein, to receive the package metadata, the instructions are further to cause the processing device to create hashes of one or more untrusted packages among the packages that are provided by an untrusted source.

11. The computer-readable medium of claim 10, wherein one or more known packages among the packages have a known package type, wherein known attribute types of the attribute values of the known packages are predefined for the known package type, and wherein, to receive the package metadata, the instructions are further to cause the processing device to access a portion of the known packages based on the known package type to identify the attribute values for the known attribute types of the known packages.

12. The computer-readable medium of claim 11, wherein one or more custom packages among the packages have a custom package type, wherein custom attribute types of the attribute values of the custom packages are defined in a configuration setting for the custom package type, wherein the configuration setting specifies identifiers or locations of the custom attribute types in the custom packages that are used to locate the attribute values for the custom attribute types within the custom packages, and wherein, to receive the package metadata, the instructions are further to cause the processing device to identify the custom packages as having the custom package type and use the identifiers or the locations of the custom attribute types for the custom package type to identify the attribute values for the custom attribute types within the custom packages.

13. A system comprising:
a memory that stores instructions; and
a processing device, in a platform-as-a-service (PaaS) system, configured to execute the instructions to:
receive package metadata comprising one or more attribute values for each of a plurality of packages, wherein each of the packages comprises one or more components of one or more applications to execute on the PaaS system, and wherein, to receive the package metadata, the processing device is further configured to execute the instructions to receive the attribute values of one or more trusted packages among the packages from a trusted source that provides the trusted packages and without a scan, by the PaaS system, of contents of the trusted packages for the attribute values of the trusted packages;

receive threat metadata comprising one or more attribute values for each of a plurality of threats;

store the package metadata or the threat metadata in one or more data stores; and compare the attribute values of the packages to corresponding ones of the attribute values of the threats to determine that at least one package among the packages comprises at least one threat from the threats.

14. The system of claim 13, wherein the processing device is further configured to execute the instructions to rebuild and redeploy the package in response to the determination that the package comprises the threat.

15. The system of claim 14, wherein the comparison of the attribute values of the packages to the corresponding ones of the attribute values of the threats occurs without a comparison of the attribute values of the packages to the corresponding ones of the attribute values of the threats at runtime of the applications in the packages.

16. The system of claim 15, wherein, to receive the package metadata, the processing device is further configured to execute the instructions to create hashes of one or more untrusted packages among the packages that are provided by an untrusted source.

17. The system of claim 16, wherein one or more known packages among the packages have a known package type, wherein known attribute types of the attribute values of the known packages are predefined for the known package type, and wherein, to receive the package metadata, the processing device is further configured to execute the instructions to access a portion of the known packages based on the known package type to identify the attribute values for the known attribute types of the known packages.

18. The system of claim 17, wherein one or more custom packages among the packages have a custom package type, wherein custom attribute types of the attribute values of the custom packages are defined in a configuration setting for the custom package type, wherein the configuration setting specifies identifiers or locations of the custom attribute types in the custom packages that are used to locate the attribute values for the custom attribute types within the custom packages, and wherein, to receive the package metadata, the processing device is further configured to execute the instructions to identify the custom packages as having the custom package type and use the identifiers or the locations of the custom attribute types for the custom package type to identify the attribute values for the custom attribute types within the custom packages.

* * * * *